(12) United States Patent
Diwakar et al.

(10) Patent No.: US 11,893,102 B1
(45) Date of Patent: Feb. 6, 2024

(54) INTELLIGENT AUTHENTICATION GATEWAY

(71) Applicant: Intuit Inc., Mountain View, CA (US)

(72) Inventors: Bernard Samuel Diwakar, San Jose, CA (US); Gaurav Varma, Santa Clara, CA (US); Mark Joseph Hughes, Poway, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/137,905

(22) Filed: Apr. 21, 2023

(51) Int. Cl.
| | |
|---|---|
| *G06F 21/00* | (2013.01) |
| *G06F 21/40* | (2013.01) |
| *H04L 9/40* | (2022.01) |
| *G06F 21/41* | (2013.01) |
| *H04L 61/4523* | (2022.01) |

(52) U.S. Cl.
CPC .............. *G06F 21/40* (2013.01); *G06F 21/41* (2013.01); *H04L 61/4523* (2022.05); *H04L 63/0815* (2013.01); *H04L 63/0846* (2013.01); *H04L 2463/082* (2013.01)

(58) Field of Classification Search
None
See application file for complete search history.

(56) References Cited

U.S. PATENT DOCUMENTS

| 8,769,651 B2* | 7/2014 | Grajek | H04L 63/0815 726/8 |
|---|---|---|---|
| 10,212,170 B1* | 2/2019 | Canavor | H04L 63/083 |
| 11,659,392 B2* | 5/2023 | Avetisov | H04W 12/60 726/1 |
| 2006/0200425 A1* | 9/2006 | Steele | G06Q 20/382 705/64 |
| 2011/0314532 A1* | 12/2011 | Austin | H04L 63/0892 726/8 |
| 2017/0237743 A1* | 8/2017 | Bestermann | H04W 48/02 726/4 |
| 2017/0279804 A1* | 9/2017 | Bhargava | G06Q 10/10 |
| 2021/0021605 A1* | 1/2021 | Innes | H04L 63/104 |
| 2021/0168136 A1* | 6/2021 | Divoux | G06F 21/34 |
| 2023/0239284 A1* | 7/2023 | Simic | H04L 63/0815 726/8 |

\* cited by examiner

*Primary Examiner* — Maung T Lwin
(74) *Attorney, Agent, or Firm* — Paradice & Li LLP (57) ABSTRACT

Systems and methods for user authentication are disclosed. An example method includes receiving a request for access to a first secured service, the request corresponding to a first user, determining whether or not the request for access is valid, in response to determining that the request for access is valid, determining whether or not the first user has successfully performed a secondary authentication within a predetermined time period of the request for access, and in response to determining that the first user has successfully performed the secondary authentication within the predetermined time period of the valid request for access, providing the first user with access to the secured service.

17 Claims, 5 Drawing Sheets

INTELLIGENT AUTHENTICATION GATEWAY

TECHNICAL FIELD

This disclosure relates generally to methods for user authentication, and more particularly to multi-factor user authentication.

BACKGROUND

Access to a variety of databases, applications, servers, services, devices, websites, and so on is often limited to authenticated users. Such authentication may include a primary authentication, such as based on the user submitting credentials such as a username and password, and may increasingly use secondary authentication, such as two-factor authentication (2FA) or multi-factor authentication (MFA). Such secondary authentication may require a user to provide additional credentials or an additional response independent of the primary authentication. Secondary authentication may be provided through a variety of options. For example, a code may be sent to the user via a secondary user device such as a cellular phone or a tablet, which the user must submit for secondary verification. Alternatively, secondary authentication may include phoning the user to verify that the user has attempted to log in to the secured service. Further, the user may have an application installed on their device, such as an authentication application, and the secondary authentication may include the user submitting a code generated by the authentication application. In some other options, the user may affirm the validity of the authentication request by selecting an option in the authentication application.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect described in this disclosure can be implemented as a computer-implemented method for user authentication. The method includes receiving a request for access to a first secured service, the request corresponding to a first user, determining whether or not the request for access is valid, in response to determining that the request for access is valid, determining whether or not the first user has successfully performed a secondary authentication within a predetermined time period of the request for access, and in response to determining that the first user has successfully performed the secondary authentication within the predetermined time period of the valid request for access, providing the first user with access to the secured service.

Another innovative aspect described in this disclosure can be implemented as a system for user authentication. An example system includes one or more processors and a memory storing instructions for execution by the one or more processors. Execution of the instructions causes the system to perform operations including receiving a request for access to a first secured service, the request corresponding to a first user, determining whether or not the request for access is valid, in response to determining that the request for access is valid, determining whether or not the first user has successfully performed a secondary authentication within a predetermined time period of the request for access, and in response to determining that the first user has successfully performed the secondary authentication within the predetermined time period of the valid request for access, providing the first user with access to the secured service.

Another innovative aspect described in this disclosure can be implemented as a computer-implemented method for user authentication. The method includes receiving a non-browser based request for access to a first database, the request corresponding to a first user, determining whether or not the non-browser based request for access is valid, in response to determining that the non-browser based request for access is valid, determining whether or not the first user has successfully performed a single sign-on authentication using a browser-based interface within a predetermined time period of the request for access, and, in response to determining that the first user has successfully performed the single sign-on authentication within the predetermined time period of the request for access, providing the first user with access to the first database.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Specific implementations will now be described in detail with reference to the accompanying figures. Like elements in the various figures are denoted by like reference numerals for consistency. In the following detailed description, numerous specific details are set forth in order to provide a more thorough understanding of the present disclosure. However, it will be apparent to one of ordinary skill in the art that aspects of the disclosure may be practiced without these specific details. In other instances, well-known features have not been described in detail to avoid unnecessarily complicating the description.

Two-factor authentication (2FA), or more generally multifactor authentication (MFA) techniques are increasingly common for increasing security of user access to applications, services, and so on. These techniques may augment simple authentication techniques, such as using a login and password, with one or more additional techniques, requiring a user to provide additional details, which may be called authentication factors, to verify their identify and eligibility to access secured resources. For example, a code may be sent to the user via a user device such as a cellular phone or a tablet, which the user must submit, or select. Alternatively, a user may receive a phone call to verify that the user has attempted to log in to the secured service. Further, the user may have an application installed on their device, such as an authentication application, which may generate a code which the user may input for verification. In some other options, the user may affirm the validity of the authentication request by selecting an option in the authentication application, such as an option affirming that the user has attempted to log in to the secured service.

Further, browser-based authentication techniques commonly use single sign-on (SSO) techniques. SSO techniques may provide a browser-based interface for accessing several software systems using a single login and 2FA or MFA. However, conventional SSO techniques may not be fully integrated with legacy systems, firewalls, databases, and other devices. This may require a user to submit authentication factors multiple times when authenticating with such systems. For example, some database clients may require a user to resubmit authentication factors for each tab opened within the software. This duplicative effort is undesirable. Alternatively, if a legacy system is not integrated with SSO or MFA at all, the system may not benefit from the additional security provided by 2FA/MFA. Further, if the authentication factors require the use of a user's phone or tablet, and the user does not currently possess the device, then the user cannot provide the requested authentication factors and therefore cannot access protected information. Additionally, some legacy systems or databases may not provide the user with an in-band (that is, within the legacy system or database software itself) notification that the authentication request requires submission of an authentication factor from a different device. This may be a problem for users who may be unaware that they need to check their phone or tablet in order to log in, leading to frustration and confusion, particularly for new or inexperienced users. It would therefore be desirable to improve ease of use and to simplify the submission of authentication factors while maintaining the security provided by requiring MFA for access to secured systems.

The example implementations provide an intelligent authentication gateway or "IAG" which may be integrated with browser-based authentication systems such as SSO in order to record successful authentications, such as successful MFA based authentications. Subsequent requests for access to protected systems, such as legacy systems, databases, firewalls, and other systems not fully integrated with the browser-based authentication systems may not require the submission of additional authentication factors and may be authenticated based on a recorded successful authentication so long as the subsequent request occurs within a threshold period of time, such as two hours. An example IAG may include a browser or web-based interface for user authentication such as MFA based authentication, in addition to a backend interface which may be integrated with protected systems, including legacy systems, databases, firewalls, and other systems not fully integrated with the browser-based authentication systems.

Various aspects of the present disclosure provide a unique computing solution to simplifying user authentication based on 2FA or MFA and extending the security provided by authentication factors to protected systems not fully integrated with browser based authentication systems. Extending the security provided by authentication factors to systems not fully integrated with browser-based authentication systems without requiring the repeated submission of authentication factors is an improvement to the functionality of the computer system and technological field. The efficiency of the computer system, for example, is improved by increasing the variety of systems which may be protected by browser-based MFA authentication systems and by reducing the frequency at which authentication factors must be submitted for protected systems not fully integrated with the browser-based authentication systems. In addition, such processes performed by the IAGs described herein cannot be performed in the human mind, much less using pen and paper. As such, implementations of the subject matter disclosed herein are not an abstract idea such as organizing human activity or a mental process that can be performed in the human mind and is integrated into a practical application.

Figure 1:
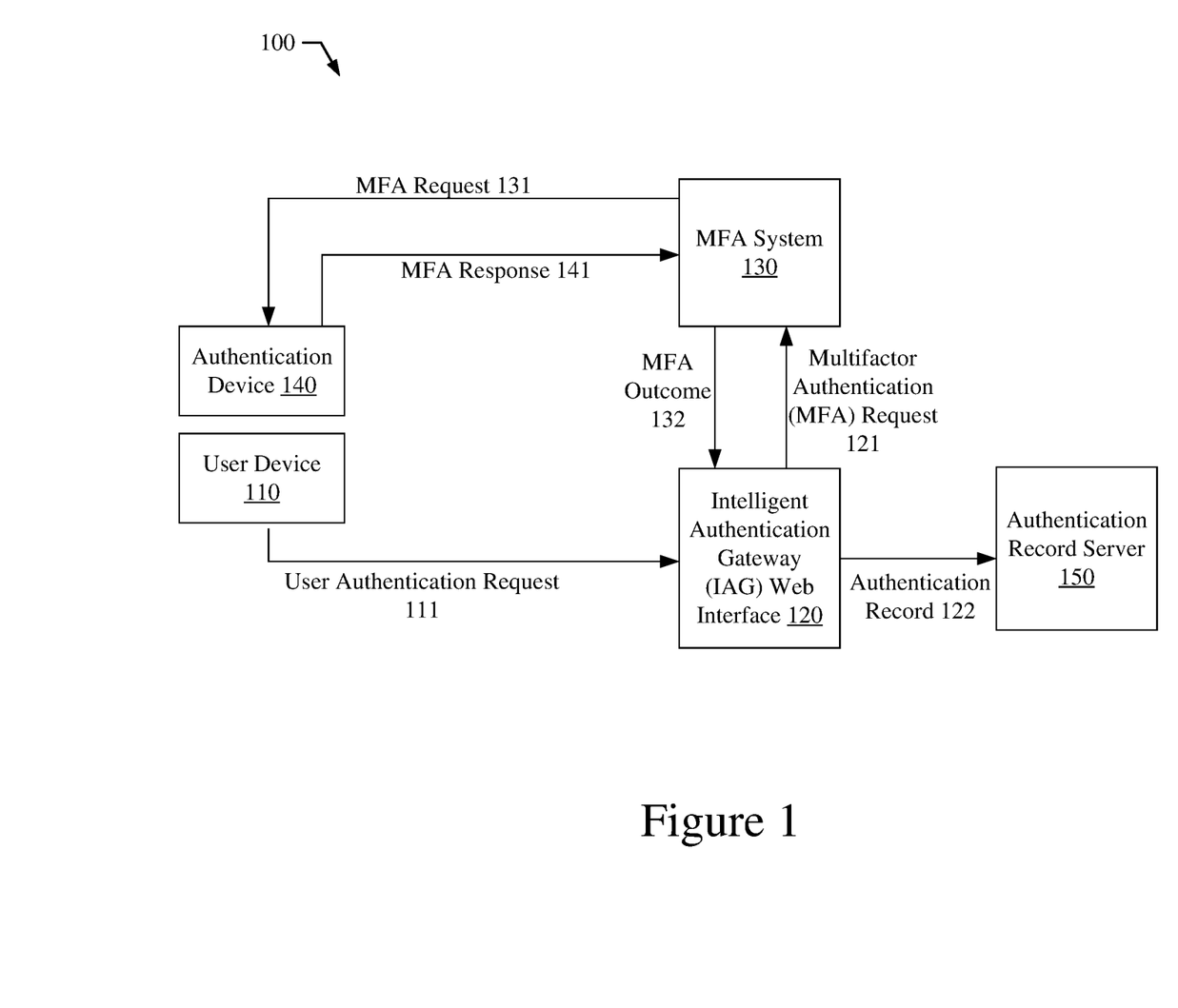
FIG. 1 shows an example process flow for a multifactor authentication (MFA) operation performed by an intelligent authentication gateway (IAG), in accordance with some implementations.

FIG. 1 shows an example process flow 100 for a multi-factor authentication (MFA) operation performed by an intelligent authentication gateway (IAG), in accordance with some implementations. For example, the MFA operation may be a single sign-on (SSO) operation for a browser- or web-based user authentication. Such an SSO operation may be a federated identity management operation performed in accordance with a Kerberos protocol, in accordance with security assertion markup language (SAML), in accordance with OpenID Connect (OIDC), or in accordance with another suitable authentication technology. A user, seeking access to a secured service, such as a secured application, website or SSO-compatible system, sends a user authentication request 111 via a user device 110. The user authentication request 111 is sent to an Intelligent Authentication Gateway Web Interface 120. The user device 110 may be a computer, such as a desktop or laptop computer, a mobile device such as a cellular phone or a tablet, or any other suitable device. The user authentication request 111 may include one or more credentials associated with a corresponding user of the user device 110, such as a username and a password which, or other authentication credentials. For example, the user may be prompted to input a username and password or another credential for inclusion in the user authentication request 111.

The IAG web interface 120 may receive the user authentication request 111 and pass the corresponding credentials to a multifactor authentication (MFA) system 130 in a MFA request 121. The MFA system 130 may validate the credentials, and in response to the credentials being validated request one or more authentication factors from the user. In response to the credentials not being validated, the MFA system 130 may return a MFA outcome 132 indicating the login failure. While not shown in FIG. 1 for simplicity, a login failure message may be returned to the user device 110. In response to the credentials being validated, the MFA system may send an MFA request 131 to an authentication device 140 for the one or more authentication factors. In some aspects, the authentication device 140 may be a separate device accessible to the user, such as a smartphone or tablet, while in some other aspects, the authentication device 140 may be the user device 110. In some aspects, the requested authentication factors may include an authentication code sent via a text message to the authentication device 140, via a call placed to the authentication device 140, or via an email sent to the user. The authentication factors may include a code generated by an authentication application installed on the authentication device 140. The authentication factors may include a user response provided by the user through an authentication application installed on the authentication device 140, such as a swipe, tap, or other gesture confirming that the user submitted the user authentication request 111. In some aspects, the authentication factors may use a hardware token coupled to the authentication device 140. The authentication factors may also be based on the user's submission of biometric data in response to the MFA request 131, such as based on a fingerprint, retinal scan, and so on.

The authentication device 140 may respond to the MFA request 131 with an MFA response 141 including or otherwise based on the requested authentication factors. The MFA system may determine whether or not the authentication factors are valid and return MFA outcome 132 to the IAG web interface 120 indicating either a login failure if the authentication factors are not validated, or indicating a successful authentication if the authentication factors are validated. One or more additional authentication tokens or other authorization date may be issued with or in combination with the MFA outcome message 132. For example, when the MFA system 130 is based on Kerberos, a ticket granting ticket (TGT) may be issued with the successful authentication, the TGT fetching service tickets for other applications integrated with the MFA system 130.

In response to the MFA outcome 132 indicating a successful authentication using the requested authentication factors, the IAG web gateway may record the successful authentication of the user at an authentication record server 150 by sending an authentication record 122. In response to a successful authentication using the authentication factors, the authentication record 122 may indicate the user's successful login attempt, in addition to a time of the successful login attempt, such as a timestamp. In some aspects, in response to a failed authentication attempt, such as based on invalid credentials in the user authentication request 111 or the failure to validate requested authentication factors, the authentication record 122 may indicate the failed login attempt, in addition to the time of the failed login attempt. In some aspects, the authentication record server 150 may operate in accordance with a lightweight directory authentication protocol (LDAP). In some other aspects, the authentication record server 150 may operate in accordance with a remote authentication dial-in user service (RADIUS). While not shown in FIG. 1 for simplicity, in response to a successful user login using the requested authentication factors, the user may be provided with access to the requested secured service.

As discussed above, many secured systems may not be fully integrated with browser-based authentication systems such as SSO. For example, these secured systems may include legacy systems, database systems devices or systems having a command line interface (CLI) but no web interface, network security devices such as firewalls, and so on. For such systems, SSO may be unavailable, or may be incompletely integrated, requiring a user to submit authentication factors with every attempted login. As an example, for some implementations of DbVisualizer, a database client, a user may be prompted to log in again for every tab opened in the software, which may be undesirable and time consuming for users, in addition to not providing any increase in the security of the system.

In accordance with the example implementations, the IAG web interface 120 may record successful MFA based login attempts, such as by sending the authentication record 122 to the authentication record server 150. The IAG may also include a backend interface which may be coupled to secured systems not fully integrated with browser-based authentication systems in order to better secure access to these secured systems without requiring the repeated submission of authentication factors.

Figure 2:
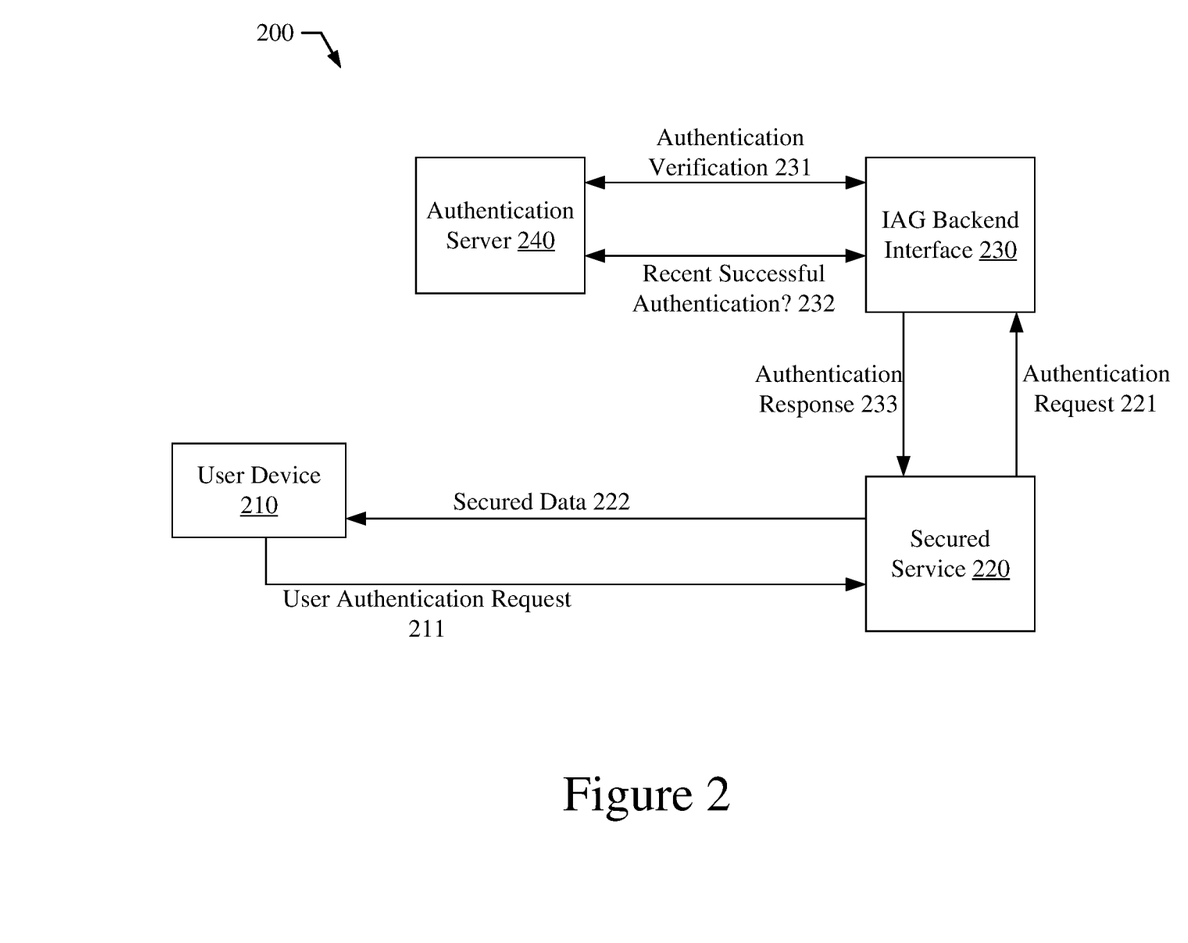
FIG. 2 shows an example process flow associated with an IAG backend interface, in accordance with example implementations.

FIG. 2 shows an example process flow 200 associated with an IAG backend interface, in accordance with example implementations. A user, such as the user described above with respect to FIG. 1, sends a user authentication request 211 via a user device 210. The user authentication request 211 may include one or more credentials, described above with respect to FIG. 1, such as a username and password. The user authentication request 211 is sent to a secured service 220. The secured service 220 is a legacy system, a database system, a system having a CLI but no web interface, or another secured system not fully integrated with a browser-based authentication system such as SSO. The secured service 220 sends an authentication request 221 to an IAG backend interface 230. The authentication request 221 may include the credentials for the user authentication request 211.

The IAG backend interface 230 validates the credentials in or associated with the authentication request 221. More particularly, the IAG backend interface 230 exchanges messages (Authentication Verification 231) with an authentication server 240 to validate the credentials. For example, the authentication server 240 may be an example of the authentication record server 150, and may operate in accordance with a suitable protocol such as LDAP, RADIUS, or similar. In some aspects, the authentication request 221 may be validated by the IAG backend interface 230 only when an originating address of the authentication request 221 is validated. For example, the authentication request 221 may be considered valid in some aspects only when its originating address is an approved address, such as an address in a whitelist of approved addresses. Such a whitelist may be stored for example in a memory of or coupled to the IAG backend interface 230. In some aspects, the IAG backend interface 230 may include the authentication server 240, while in some other aspects, the IAG backend interface 230 may not include but be coupled to the authentication server 240. While not shown in FIG. 2 for simplicity, if the authentication verification 231 fails, then an authentication failure message may be sent back to the secured service 220 and the user device 210.

If the authentication verification 231 is successful, that is if the credentials in the authentication request 221 are determined to be valid, then the IAG backend interface 230 queries the authentication server 240 (Recent Successful Authentication? 232) to determine whether or not a successful MFA authentication has been completed by the user within a threshold period of time. For example, similarly to FIG. 1, successful authentications using the authentication factors may result in authentication records being stored in the authentication server indicating the user's previous successful login attempts, in addition to a time for each such successful login attempt, such as a timestamp. In some aspects only a record of the most recent successful authentication attempt is stored.

In response to a record of a recent successful authentication having a corresponding time within the threshold period of time, the IAG backend interface 230 sends an authentication response 233 to the secured service 220, indicating that the user is authenticated for access to the secured service 220. Accordingly, the IAG allows a user to gain access to the secured service 220 without the submission of additional authentication factors so long as subsequent authentication requests occur within the threshold time period of a recorded successful authentication including the submission of the additional authentication factors.

In some aspects, each stored authentication record may be associated with a plurality of secured services, where the secured services may include applications, websites, and services fully compatible with browser-based authentication, in addition to secured legacy systems, databases, applications, and devices which are not compatible with or otherwise not fully integrated with browser-based authentication. In some aspects, if an authentication record exists having a time within the threshold time period, and it is associated with any of the plurality of secured services including the secured service 220, then the user may be authenticated for access to the secured service 220. This may allow a user's recent successful browser-based MFA authentications to be used for securing and simplifying secure access to services not compatible with browser-based authentication.

While not shown in FIG. 2 for simplicity, if the user's submitted credentials are authenticated as valid, but there is no authentication record stored in the authentication server 240 having a time within the threshold time period, then the user may be prompted to submit additional authentication factors, assuming the secured service 220 is compatible with such browser-based authentication.

Figure 3:
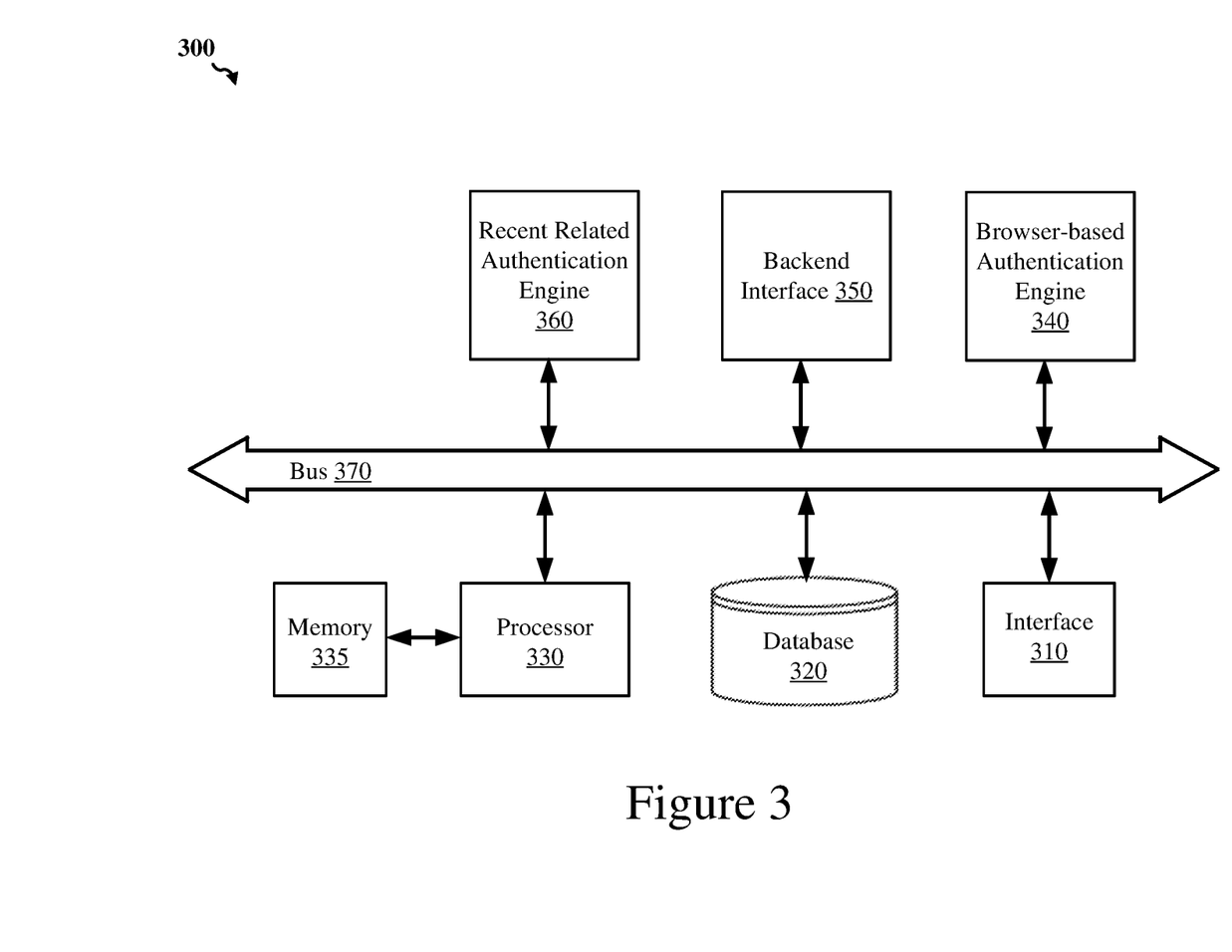
FIG. 3 shows an example IAG system that may be used for user authentication, according to some implementations.

FIG. 3 shows an example IAG system 300 that may be used for user authentication, according to some implementations. The IAG system 300 includes an interface 310, a database 320, a processor 330, a memory 335 coupled to the processor 330, a browser-based authentication engine 340, a backend interface 350, and recent related authentication engine 360. In some implementations, the various components of the IAG system 300 may be interconnected by at least a data bus 370, as depicted in the example of FIG. 3. In other implementations, the various components of the IAG system 300 may be interconnected using other suitable signal routing resources. The IAG system 300 may be or may be part of or connected to a server that provides access to an online website to users via a network, such as the internet.

The interface 310 may include a screen, an input device, or other suitable elements that allow a user to provide information to the IAG system 300 and/or to retrieve information from the IAG system 300. Example information that can be provided to the IAG system 300 may include configuration information for the IAG system 300, configuration data for the browser-based authentication engine 340, backend interface 350, or recent related authentication engine 360, connection information for communicating with other devices described above with respect to FIGS. 1-2, and so on. Example information that can be retrieved from the IAG system 300 may include information indicating whether or not authentication requests are validated, whether or not successful requests for authentication are associated with stored authentication records, and the like.

The database 320, which may represent any suitable number of databases, may store any suitable information pertaining to authenticating users of the IAG system 300, authentication records, or the like. In some implementations, the database 320 may be a relational database capable of presenting the information as data sets to a user in tabular form and capable of manipulating the data sets using relational operators. In some aspects, the database 320 may use Structured Query Language (SQL) for querying and maintaining the database 320.

The data processors 330, which may be used for general data processing operations (such as performing credential validation operations, recording authentication records, and the like), may be one or more suitable processors capable of executing scripts or instructions of one or more software programs stored in the IAG system 300 (such as within the memory 335). The data processors 330 may be implemented with a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the data processors 330 may be implemented as a combination of computing devices (such as a combination of a DSP and a microprocessor, a plurality of microprocessors, one or more microprocessors in conjunction with a DSP core, or any other such configuration).

The memory 335, which may be any suitable persistent memory (such as non-volatile memory or non-transitory memory) may store any number of software programs, executable instructions, machine code, algorithms, and the like that can be executed by the data processors 330 to perform one or more corresponding operations or functions. In some implementations, hardwired circuitry may be used in place of, or in combination with, software instructions to implement aspects of the disclosure. As such, implementations of the subject matter disclosed herein are not limited to any specific combination of hardware circuitry and/or software.

The browser-based authentication engine 340 may authenticate users, such as using two-factor or other MFA authentication techniques, using a browser-based interface, and may store records of successful authentications in an authentication record server. For example, as discussed above, such a browser-based interface may perform one or more operations of the IAG web interface 120 or MFA system 130 of FIG. 1 and may store authentication records in an authentication record server 150.

The backend interface 350 may authenticate users to legacy systems, databases, and other applications and devices not fully integrated or compatible with browser-based authentication systems. For example, the backend interface 350 may be performed one or more operations of the IAG backend interface 230 described above with respect to FIG. 2. More particularly, the backend interface 350 may receive authentication requests from users, validate such requests, such as by validating credentials contained in the requests, and querying an authentication record server, such as using the recent related authentication engine 360. In response to an authentication request being validated, and a recent record of a successful authentication being found in the authentication server, the backend interface may issue an authentication response, indicating that the user is authorized to access the legacy system, database, application, or device based on the user's recent submission of authorization factors as indicated by the recent authentication record. For example, as discussed above, each stored authentication record may be associated with a time of the corresponding authentication attempt, and such an authentication record may be considered sufficiently recent to a current authentication attempt when the current authentication attempt occurs within a threshold period of the time associated with a stored authentication record. Such a threshold period may be two hours in some aspects.

The recent related authentication engine 360 may store records of authentication requests received from the browser-based authentication engine 340 and search such stored records in response to requests from the backend interface 350. In some aspects, the recent related authentication engine 360 may perform operations of the authentication record server 150 of FIG. 1 or the authentication server 240 of FIG. 2. In some aspects, the recent related authentication engine 360 may include an LDAP server or may operate in accordance with another suitable protocol for storing authentication records.

The particular architecture of the IAG system 300 shown in FIG. 3 is but one example of a variety of different architectures within which aspects of the present disclosure may be implemented. For example, in other implementations, the IAG system 300 may not include the browser-based authentication engine 340, the functions of which may be implemented by the processors 330 executing corresponding instructions or scripts stored in the memory 335. In some other implementations, the functions of the backend interface 350 may be performed by the processors 330 executing corresponding instructions or scripts stored in the memory 335. Similarly, the functions of the recent related authentication engine 360 may be performed by the processors 330 executing corresponding instructions or scripts stored in the memory 335.

Figure 4:
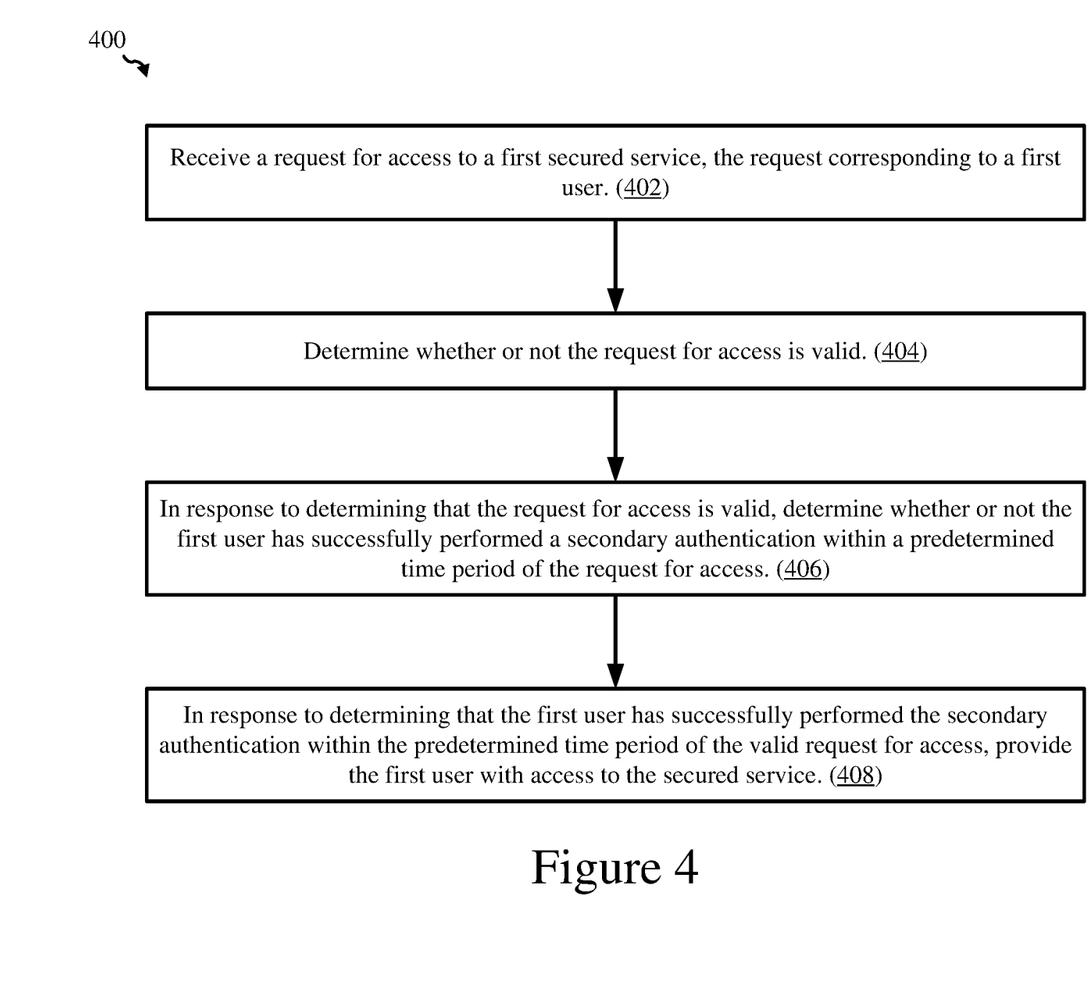
FIG. 4 shows an illustrative flow chart depicting an example operation for user authentication, in accordance with some implementations.

FIG. 4 shows an illustrative flow chart depicting an example operation 400 for user authentication, in accordance with some implementations. The operation 400 may be performed by an intelligent authentication gateway (IAG), such as IAG system 300, or using one or more components of process flow 100 of FIG. 1 or process flow 200 of FIG. 2. It is to be understood that the example operation 400 may be performed by any suitable systems, computers, or servers.

At block 402, the IAG system 300 receives a request for access to a first secured service, the request corresponding to a first user. A means for receiving the request for access may include the IAG backend interface 230 of FIG. 2, or the interface 310 or backend interface 350 of FIG. 3.

At block 404, the IAG system 300 determines whether or not the request for access is valid. A means for determining whether or not the request for access is valid may include the IAG backend interface and authentication server 240 of FIG. 2, or the interface 310, database 320, and backend interface 350 of FIG. 3.

At block 406, the IAG system 300, in response to determining that the request for access is valid, determines whether or not the first user has successfully performed a secondary authentication within a predetermined time period of the request for access. A means for determining whether or not the first user has successfully performed the secondary authentication within the predetermined time period of the request for access may include the IAG backend interface 230 and authentication server 240 of FIG. 2, or the interface 310, database 320, backend interface 350, and recent related authentication engine 360 of FIG. 3.

At block 408, the IAG system 300, in response to determining that the first user has successfully performed the secondary authentication within the predetermined time period of the valid request for access, provides the first user with access to the secured service. A means for providing the first user with access to the secured service may include the IAG backend interface 230 of FIG. 2, or the interface 310 and backend interface 350 of FIG. 3.

In some aspects, the secondary authentication corresponds to a previous request for access to a second secured service associated with the first secured service.

In some aspects, the request for access to the first secured service received in block 402 is a non-browser based request for access to a first database, and the secondary authentication corresponds to a single sign-on authentication using a browser-based interface. In some aspects, determining whether or not the request for access is valid in block 404 includes validating the request for access, wherein the request for access is validated in accordance with a first protocol. In some aspects, the first protocol is a lightweight directory access protocol (LDAP). In some aspects, the first protocol is a remote authentication dial-in user service (RADIUS) protocol. In some aspects, determining whether or not the request for access is valid in block 404 includes validating an originating address corresponding to the request for access. In some aspects, the non-browser based request for access to the first database is a request in accordance with an LDAP or a RADIUS authentication protocol. In some aspects, determining whether or not the request for access is valid in block 404 further includes validating the request for access using an authentication server coupled to the IAG. In some aspects, the authentication server is an LDAP server.

In some aspects, the operation 400 further includes, in response to determining that the first user has not successfully performed the secondary authentication within the predetermined time period of the request for access, denying the first user access to the secured service.

Figure 5:
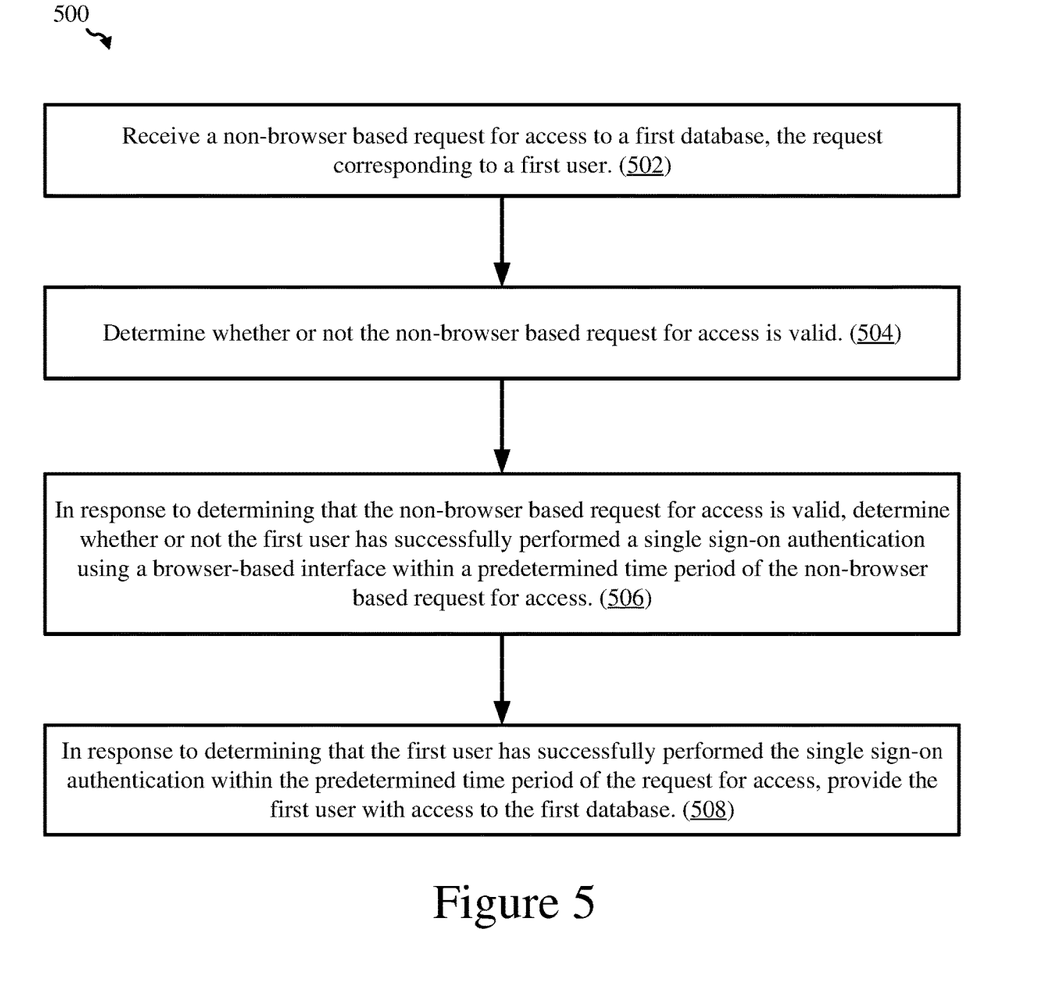
FIG. 5 shows an illustrative flow chart depicting an example operation for user authentication, in accordance with some implementations.

FIG. 5 shows an illustrative flow chart depicting an example operation 500 for user authentication. The operation 500 may be performed by an intelligent authentication gateway (IAG), such as IAG system 300, or using one or more components of process flow 100 of FIG. 1 or process flow 200 of FIG. 2. It is to be understood that the example operation 500 may be performed by any suitable systems, computers, or servers.

At block 502, the IAG system 300 receives a non-browser based request for access to a first database, the request corresponding to a first user. A means for receiving the non-browser based request for access may include the IAG backend interface 230 of FIG. 2, or the interface 310 or backend interface 350 of FIG. 3.

At block 504, the IAG system 300 determines whether or not the non-browser based request for access is valid. A means for determining whether or not the non-browser based request for access is valid may include the IAG backend interface and authentication server 240 of FIG. 2, or the interface 310, database 320, and backend interface 350 of FIG. 3.

At block 506, the IAG system 300, in response to determining that the non-browser based request for access is valid, determine whether or not the first user has successfully performed a single sign-on authentication using a browser-based interface within a predetermined time period of the request for access. A means for determining whether or not the first user has successfully performed the single sign-on authentication using the browser-based interface within the predetermined time period of the non-browser based request for access may include the IAG backend interface 230 and authentication server 240 of FIG. 2, or the interface 310, database 320, backend interface 350, and recent related authentication engine 360 of FIG. 3.

At block 508, the IAG system 300, in response to determining that the first user has successfully performed the single sign-on authentication within the predetermined time period of the request for access, provide the first user with access to the first database. A means for providing the first user with access to the first database may include the IAG backend interface 230 of FIG. 2, or the interface 310 and backend interface 350 of FIG. 3.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c, and "one or more of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations to be performed in performing aspects of the present disclosure, one or more operations may be performed in any order or concurrently to perform the described aspects of the disclosure. In addition, or to the alternative, a depicted operation may be split into multiple operations, or multiple operations that are depicted may be combined into a single operation. Thus, the claims are not intended to be limited to the implementations shown herein but are to be accorded the widest scope consistent with this disclosure, the principles, and the novel features disclosed herein.

What is claimed is:

1. A computer-implemented method for user authentication, the method performed by an intelligent authentication gateway (IAG) and comprising:
   receiving a request for access to a first secured service, the request corresponding to a first user;
   determining whether or not the request for access is valid;
   in response to determining that the request for access is valid, determining whether or not the first user has successfully performed a secondary authentication within a predetermined time period of the request for access, the secondary authentication corresponding to a previous request for access to a second secured service associated with the first secured service;
   in response to determining that the first user has not successfully performed the secondary authentication within the predetermined time period of the request for access, denying the first user access to the first secured service; and
   in response to determining that the first user has successfully performed the secondary authentication within the predetermined time period of the valid request for access, providing the first user with access to the first secured service.

2. The computer-implemented method of claim 1, wherein the request for access to the first secured service comprises a non-browser based request for access to a first database, and wherein the secondary authentication corresponds to a single sign-on authentication using a browser-based interface.

3. The computer-implemented method of claim 2, wherein determining whether or not the request for access is valid comprises validating the request for access, wherein the request for access is validated in accordance with a first protocol.

4. The computer-implemented method of claim 3, wherein the first protocol is a lightweight directory access protocol (LDAP).

5. The computer-implemented method of claim 3, wherein the first protocol is a remote authentication dial-in user service (RADIUS) protocol.

6. The computer-implemented method of claim 3, wherein determining whether or not the request for access is valid further comprises validating an originating address corresponding to the request for access.

7. The computer-implemented method of claim 2, wherein the non-browser based request for access to the first database is a request in accordance with an LDAP or a RADIUS authentication protocol.

8. The computer-implemented method of claim 2, wherein determining whether or not the request for access is valid comprises validating the request for access using an authentication server coupled to the IAG.

9. The computer-implemented method of claim 8, wherein the authentication server is an LDAP server.

10. An authentication system, comprising:
one or more processors; and
a memory storing instructions that, when executed by the one or more processors, causes the system to perform operations comprising:
receiving a request for access to a first secured service, the request corresponding to a first user;
determining whether or not the request for access is valid;
in response to determining that the request for access is valid, determining whether or not the first user has successfully performed a secondary authentication within a predetermined time period of the request for access, the secondary authentication corresponding to a previous request for access to a second secured service associated with the first secured service;
in response to determining that the first user has not successfully performed the secondary authentication within the predetermined time period of the request for access, denying the first user access to the first secured service; and
in response to determining that the first user has successfully performed the secondary authentication within the predetermined time period of the request for access, providing the first user with access to the first secured service.

11. The authentication system of claim 10, wherein the request for access to the first secured service comprises a non-browser based request for access to a first database, and wherein the secondary authentication corresponds to a single sign-on authentication using a browser-based interface.

12. The authentication system of claim 11, wherein generating the authentication response comprises validating the request for access, wherein the request for access is validated in accordance with a first protocol.

13. The authentication system of claim 12, wherein the first protocol is a lightweight directory access protocol (LDAP).

14. The authentication system of claim 12, wherein the first protocol is a remote authentication dial-in user service (RADIUS) protocol.

15. The authentication system of claim 11, wherein the non-browser based request for access to the first database is a request in accordance with an LDAP or a RADIUS authentication protocol.

16. The authentication system of claim 11, wherein generating the authentication response comprises validating the request for access using an authentication server coupled to the JAG.

17. A computer-implemented method for user authentication, the method performed by an intelligent authentication gateway (IAG) and comprising:
receiving a non-browser based request for access to a first database, the request corresponding to a first user;
determining whether or not the non-browser based request for access is valid;
in response to determining that the non-browser based request for access is valid, determining whether or not the first user has successfully performed a single sign-on authentication using a browser-based interface within a predetermined time period of the request for access, the single sign-on authentication corresponding to a previous request for access to a second secured service associated with the first database;
in response to determining that the first user has not successfully performed the secondary authentication within the predetermined time period of the request for access, denying the first user access to the first secured service; and
in response to determining that the first user has successfully performed the single sign-on authentication within the predetermined time period of the request for access, providing the first user with access to the first database.

* * * * *